Dec. 8, 1942.  W. W. ROWE  2,304,123
EMBOSSED DECORATIVE FABRIC
Filed Aug. 19, 1938  3 Sheets-Sheet 2

Inventor
WILLIAM WALLACE ROWE.
Allen & Allen
Attorneys.

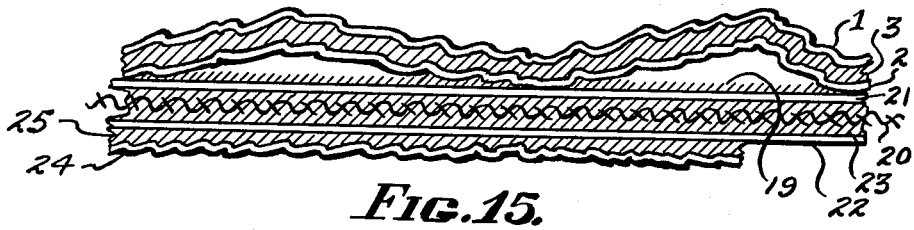
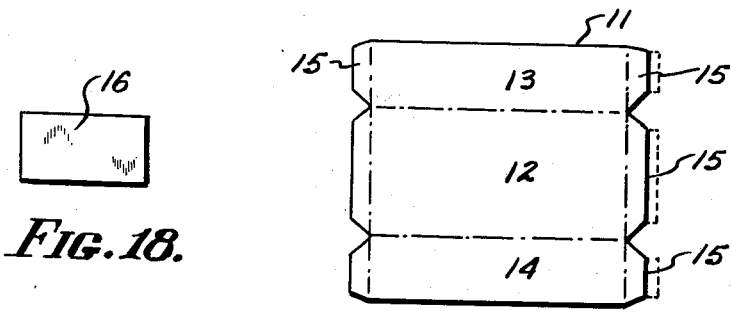
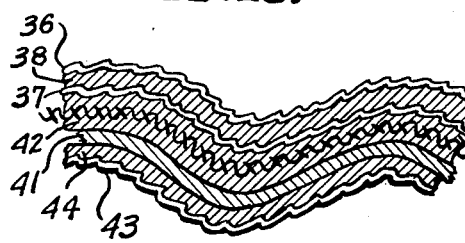
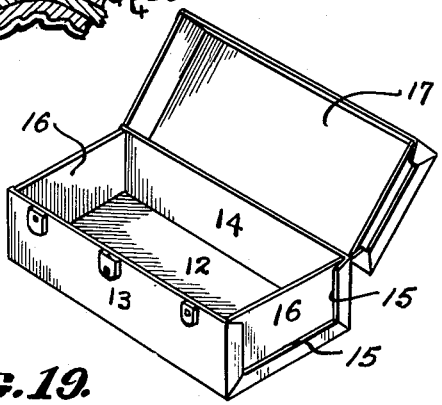
INVENTOR.
WILLIAM WALLACE ROWE.
BY Allen & Allen
ATTORNEYS.

Patented Dec. 8, 1942

2,304,123

UNITED STATES PATENT OFFICE 2,304,123

EMBOSSED DECORATIVE FABRIC

William Wallace Rowe, Cincinnati, Ohio, assignor to Cincinnati Industries, Inc., a corporation of Ohio Application August 19, 1938, Serial No. 225,822

12 Claims. (Cl. 154—2)

My invention has to do with the manufacture of superior types of embossed products. These products constitute excellent substitutes for leather; but the utility of the invention is by no means confined to products made in imitation of leather. It extends to products having embossed surfaces of any desirable design whether in imitation of naturally occurring textures or in accordance with conventional decorative design. The products of my invention range from flexible embossed structures through structures having varying degrees of flexibility or stiffness to structures which are in effect rigid panels, as will be more fully set forth hereinafter. Products of artificial leather character suitable for use in fabricating luggage, in book-binding, in upholstering, and the like may be made in accordance with my invention; again preformed structural fabrics from which articles such as luggage, containers, etc., may be directly manufactured and again structural materials suitable for use as inside or outside decoration and protection of buildings, vehicles, etc. Yet again, certain teachings of this application find utility in connection with the manufacture of articles not classifiable in the groups mentioned above, as will more fully hereinafter appear.

My invention relates primarily to the problem of causing a sheet or web of material to conform perfectly to an embossing die during embossing, so that the sheet loses its previous appearance and takes on completely a new one as determined by the die, all as will be set forth at length hereinafter. It also relates to the provision of fabrics embodying such webs or sheets.

The general objects of my invention are thus the provision of fabrics, articles and structures made of inexpensive materials and having in addition to desirable, appropriate and decorative appearances, satisfactory wear resistance, vapor and moisture proofness, and resistance to scuffing, puncturing and tearing. Other objects of my invention have to do with the formation of perfect permanent embossed configurations in materials of the types to which this invention is addressed. Still other objects of my invention have to do with the matters of obtaining suitable surface textures, colors, feel, and flexibility or stiffness. Still other objects of my invention have to do with processes for the manufacture of such fabrics and of articles therefrom as hereinafter described.

These and other objects of my invention which will be set forth hereinafter or will be apparent to one skilled in the art upon reading these specifications, I accomplish by that certain structure and arrangement of parts, by that certain process, and in those certain articles and structures of which I shall now set forth certain exemplary embodiments.

Reference may be had to the drawings wherein:

Figure 14 is a sectional view of a fabric embodying cloth which has been embossed.

Figure 15 is a sectional view of a fabric embodying cloth which has been treated for stiffness.

Figure 16 is a sectional view of still another fabric which is characterized by stiffness.

Figure 17 is a plan view of a suitcase blank.

Figure 18 is an end blank therefor.

Figure 19 is a perspective view of a so-called suitcase.

Preferred materials

Figure 1:
Figure 1 is a sectional view of an exemplary fabric prior to embossing.

In a copending application, Serial No. 124,649 filed Fabruary 8, 1937, and entitled Decorative products I have suggested the use of paper materials characterized by universal stretchability, for various types of products of which artificial leather is exemplary, and I have further suggested the embossing of such products. As in that case, I preferably employ webs which have been rendered stretchable universally by the double creping process of the Kemp Patent No. 2,008,182. In the commercial manufacture of such products I take a continuous web, such as a web of paper or cloth or one of the preformed translucent films, such as cellulose nitrate films, cellulose acetate films, rubber derivative films, and the like, known under various trade names such as Cellophane, Kodapak, Pliofilm, Paraflim, etc., or other webs including, but without limitation, metal foils, or combinations or composites of two or more of such webs, and cause them to adhere to a creping cylinder, from which they are removed by crowding by means of a helically disposed creping knife, so as to form in the webs creping crinkles lying at an angle to the axes of the webs. Then the webs are led to a second creping cylinder and removed therefrom by a knife oppositely helically disposed. The end product of this series of operations is a web, single or composite, characterized by crossing sets of creping crinkles, both sets being disposed at an angle to the axes of the webs, and stretchable in all directions.

The webs may be caused to adhere to the creping cylinder through the use of water; but in most instances I prefer to use a positive adhesive, especially since, as will presently be explained, the presence of adhesive is desired in the ultimate product. There are a large number of adhesives which may be employed including asphalt or other bitumen, waxes, tars, pitches, naturally occurring resins, artificial or synthetic resins, rubbers, rubber isomers, rubber polymers, shellac and other lacs, gum resins and thermoplastic materials, and also materials the adhesiveness of which can be developed, controlled or maintained sufficiently for the purposes referred to.

Embossing

By embossing in this specification, I mean a treatment of a web or fabric by means of a die or dies so as to cause the web or fabric to conform to the die over the whole surface thereof. In this sense embossing is to be distinguished from mere decoration or printing by indentation. A web, for example, may be printed upon by a die having raised portions, which raised portions indent the web at certain places. The web, however, retains its original appearance and texture elsewhere than at the indented places. In embossing in the sense used in this specification the web is caused to conform to the die over its whole surface, in the raised as well as in the indented portions. Thus the web wholly loses its original texture, contour, and general appearance, and takes on a new texture, contour and appearance which are those of the die.

Figure 8:
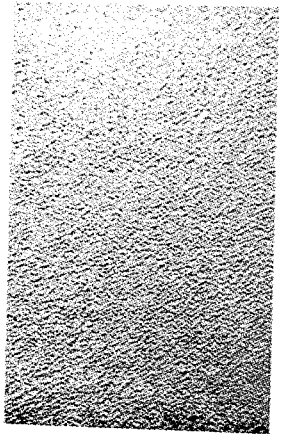
Figure 8 is a face view in natural size of a material characterized by crossing sets of creping crinkles.
Figure 9:
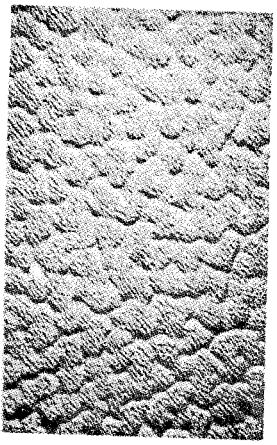
Figure 9 is a face view of such material incorrectly embossed.
Figure 11:
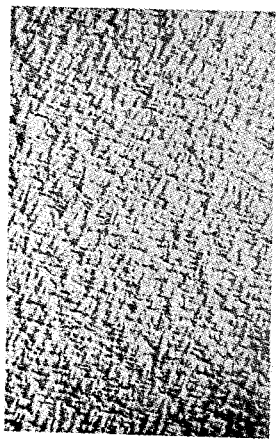
Figure 11 is an enlarged face view ($3x$) of the material of Figure 8.
Figure 12:
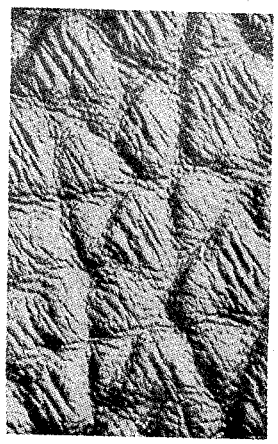
Figure 12 is an enlarged face view ($3x$) of the material of Figure 9 (incorrectly embossed).

To illustrate what I mean here, reference may be made to Figures 8 and 11 which show both in natural size and enlarged, the surface appearance and texture of a piece of universally stretchable paper characterized by crossing sets of creping crinkles. In Figures 9 and 12 the material is shown in an incorrectly embossed condition. It will be noticed that in the indentations of the design, the web conforms fairly well to the projections of the die; but in other portions the original texture of the web persists. Indeed it is exaggerated, for the unequal stretching of the web has intensified the crinkles of the paper in one direction. The result is not particularly attractive, as will be evident, and it clearly is not a faithful reproduction of the die.

The die employed in producing the products of Figs. 9, 10, 12 and 13 is a so-called female die carrying an exact reproduction of the contour and texture of so-called pup walrus leather. The reproduction on the die itself is exact even to the minute wrinkles and pores of the leather.

Figure 10:
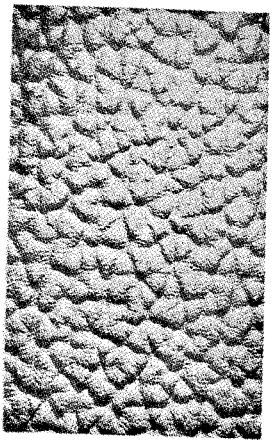
Figure 10 is a face view of the material of Figure 8 correctly embossed.
Figure 13:
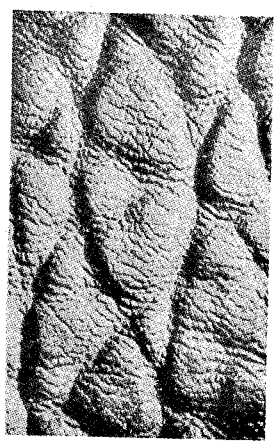
Figure 13 is an enlarged face view ($3x$) of the material of Figure 10 (correctly embossed).

In Figures 10 and 13 I have shown my materials in correctly embossed condition, and it will be seen that the web exactly follows the contour of the die, reproducing the minute wrinkles and pores of the leather. It will also be seen that the original appearance and texture of the web is completely changed to a new appearance and texture; and in particular that the original creping crinkles have visually, wholly disappeared.

A number of serious problems are involved in successfully embossing with these results, and the solution of these problems will be set forth hereinafter in these specifications. It will be understood that the difficulty of this sort of embossing varies somewhat with the depth of the depressions in the die; but using the die with which the material of Figures 10 and 13 was produced as exemplary, I am not aware of any comparable reproductive results being hitherto accomplished except through moulding with plastics. Similar results have not been attained by others with paper webs or coated fabrics, nor were such effects to be found in the artificial leathers of commerce prior to my work.

The embossing procedure may conveniently be taken up in connection with a description of particular kinds of fabrics or structures which I may make. In Figure 1 I have indicated at 1 and 2 layers making up a composite product. These layers may be similar layers of non-conjointly creped paper or paper characterized by relatively fine rugosities imparting substantial stretchability. Frequently, in practice, layer 1 is the double creped paper of the Kemp patent referred to, while layer 2 is a layer of tissue or cellulose wadding. 3 indicates a layer of adhesive between the paper layers. The structure of Figure 1 may be thought of either as complete in itself or as forming a part of a composite fabric containing other elements. Where complete in itself, the structure of Figure 1 may be formed by adhering together the coated sides of layers of paper creped by means of a positive adhesive substance such, for example, as asphalt, resins, gums or the like. The paper layers are preferably made individually, and it is my usual practice, where creping by means of an adhesive which retains a certain amount of tackiness or plastic flow at ordinary working temperatures, to adhere to the adhesive layer immediately after the creping of the paper a layer of thin tissue or cellulose wadding. This does not interfere with the subsequent adhesion of the layer to other materials either with the same or a different adhesive; and where heat sealing is employed the original adhesive on the paper may be caused to strike through the thin tissue or wadding, for the purpose desired.

Figure 2:
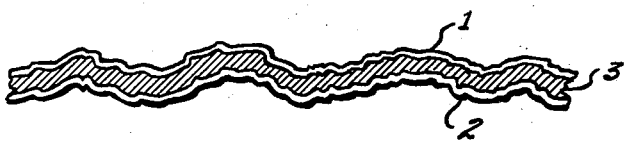
Figure 2 is a view, partially in section, of an exemplary embossed fabric.

Figure 11 shows at a magnification of three diameters the surface of kraft paper which has been creped in accordance with the Kemp teachings. It will be seen that this paper is characterized by relatively fine rugosities substantially without preponderant grain. The paper is decorative in itself and when colored, or printed upon, forms an excellent lining for embossed fabrics or structures made therefrom. In Figure 2 I have illustrated the product of Figure 1 in embossed condition. The embossing here is two-sided embossing, accomplished by means of male and female dies. The embossing machine may comprise either a pair of coacting pattern rolls or flat plates or platens located in a suitable press. The use of heat during embossing has been found to be of considerable advantage and I have secured superior results through the use of heat. I believe that the effect of heat is several-fold.

(a) It tends to soften any thermoplastic material such for example, as the layer 3 which is in the fabric, and to facilitate embossing in this way.

(b) It contributes to the production of a desirable gloss on the surface of the exposed sheet. The exact mechanism of this is not fully understood by me since the effect appears to some extent even with papers which have not been coated or saturated. Probably the matter of gloss is bound up with the matter of the elimination of the visual appearance of the creping crinkles.

(c) Where papers are saturated or coated with waxes, resins, gums, polymers and the like, a certain degree of softening or fusion in these materials at the surface contributes to the general texture and appearance.

(d) In the formation of desirable embossed products, it is necessary so to emboss them as to destroy the visual appearance of the creping crinkles or other gatherings in the paper; and I have found that the use of heat contributes very much to successful embossing in this particular.

(e) Embossing contributes to the vapor and moisture proofness of the fabric. This is believed to be due to the flow and resealing of asphalt or similar adhesives under heat.

(f) The flow and resealing causes the material to take a new and permanent set, particularly when thermoplastic materials are used. In the case of permanent setting resins, heat during embossing can be caused to change them over from the incompletely polymerized condition to the permanently set condition.

The reasons for the incorrect embossing illustrated in Figures 9 and 12 may be several-fold. If the male die is incorrectly formed and does not tend to press the fabric fully up into the interstices of the female or pattern die, this effect will be obtained, as hereinabove explained. Also, if parts of the fabric are materially thicker than other parts so as to hold the dies too far apart properly to emboss the thinner portions, this effect will be secured. Also, if there is incorrect pressure or if the stiffness of the fabric is too great for the pressure employed, this effect will be obtained. The matter of plastic flow takes care of these factors in many instances. I have already indicated that the use of heat is a strong factor in permitting proper embossing.

The matter of a desirable gloss on a product of this character is somewhat complex. The product should not be too glossy, or glassy, in appearance; nor should it look as though it were wet or oily. Yet for many uses, especially in imitation of finished leather, it should not be completely dull or matte. Ordinarily with properly formed dies and the proper embossing as indicated above, the correct or natural sheen is secured. If the original surface of the fabric was very glossy both the creping and embossing, if properly done, may tend in considerable measure to soften this gloss. The causing of the surface to conform exactly to all configurations of the die contributes to this effect. Where the surface was initially dull the use of heavy pressures in embossing tends to bring out a gloss. This is even true where the surface of the paper has not been filled. With filled papers the effect is readily secured with proper embossing. The use of heat in embossing appears possibly to contribute to the securing of the proper effect by slightly softening either ingredients of the paper or ingredients of any filler material in the paper or by driving into the paper some portions of the adhesive located therebeneath. Where a waxed paper is employed, there may for example, be a partial interfusion of this wax in the paper with ingredients derived from the adhesive 3.

Figure 4:
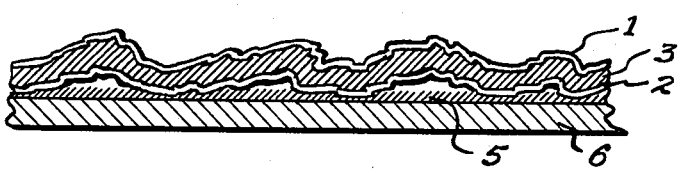
Figure 4 is a sectional view of a composite structure formed of the material of Figure 2 joined to a panel-like substance.

The material of Figure 2 in embossed condition is shown in Figure 4 adhered to an unembossed backing substance 6. Layer 2 in this instance will usually be wadding or tissue. The backing may be any desired. It may, for example, be unembossed cloth, box-board, panel board, a sheet of paper, or the surface of any article which it is desired to cover with the material of Figure 2. The material of Figure 2 is adhered to the backing 6 by a layer of adhesive 5. For this purpose the material of Figure 2 may be coated with the adhesive or the backing 6, or both. I have illustrated in Figure 4 the condition which is obtained through coating the surface of the backing 6 only. It is usually not necessary to fill up the rugosities of the material of Figure 2 completely, though if this is done, with an adhesive of suitable body, it will be clear that the rugosities will derive therefrom considerable support from the underside.

When an embossed product is cemented to a plane surface as in Figure 4, the rugosities of the embossed product are prevented from flattening out because their bases are cemented to the plane surface and therefore cannot spread. Thus a truss construction is obtained which is quite strong.

Figure 3:
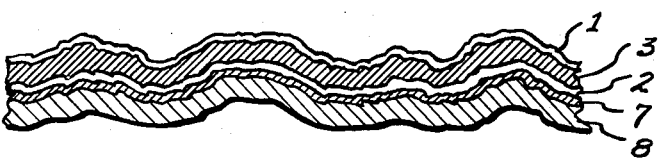
Figure 3 is a sectional view of a fabric joined to a stiffening structure, the whole being then embossed.

In Figure 3 I have shown a material of Figure 2 adhered by means of an adhesive layer 7 to a backing substance the whole being then embossed. The backing substance may again be paper, creped or uncreped cloth or thin board, in fact substantially any backing material will serve. A similar product can be made by adhering the layer 1, by means of the layer 3 directly to the layer 8, thus omitting layers 2 and 7.

At this point it should be noted that many substances including plain papers, box-boards and the like which cannot themselves be embossed deeply without disruption of the fibrous structure, can be embossed if covered with one or more layers of stretchable paper in adhesive union therewith. The surface covering of stretchable paper can be embossed as I have indicated, without disturbing its fibrous structure and this surface tends either entirely to prevent or at least greatly to minimize the disruption of the structure of the ordinarily unembossable material, and tends further to preserve its strength. Moreover, the juncture of stretchable paper with another material the whole being embossed, tends to preserve the rugosities after the embossing step. I have already explained that greater stretchability is required in the face layer 1 in embossing, so that less stretchable materials may be employed for other layers.

Figure 5:
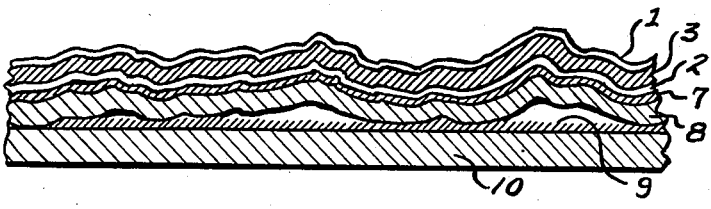
Figure 5 is a sectional view of a composite structure formed of the material of Figure 3 joined to a panel-like substance.

In Figure 5 I have shown the material of Figure 3 joined by means of an adhesive layer 9 to a backing substance 10 which may be considered to comprise the same materials as the backing 6 in Figure 4. The same considerations apply as to the adhesive union of the subtsances. It will be noted that this product is stronger and more resistant than the product of Figure 3, particularly to scuffing and to flattening of the embossed configurations. This is again due to the trussing action of the combination of the relatively stiff embossed layer 8 and the unembossed layer 10.

The structure of Figure 5, while it has many other uses, is particularly interesting in the field of the manufacture of inexpensive luggage. In the past it has been the practice in making inexpensive luggage of the suitcase type, to take a blank of relatively heavy box-board and paste it to a plain paper layer, usually filled or treated with casein. Then an attempt was made to emboss the whole so as to give to the paper layer some resemblance to leather. The embossing was not perfect for reasons which have been explained at length above, the paper layer tended to rupture, the act of embossing the heavy board tended very greatly to weaken it, and the under side of the board which formed the suitcase had in part at least an embossed or bumpy configuration which was undesirable. All of these difficulties are avoided in the structure of Figure 5. A perfect embossed surface is obtained and the embossings are thoroughly reenforced both by the layer 8 and by the trussing action of this layer and the layer 10. Moreover the layer 10 has not been embossed and is not weakened; and its underside is smooth.

In the manufacture of blanks for suitcases I take one or more layers of creped paper suitably treated as set forth above, and adhere them together and/or to a relatively thin layer of box-board 8. As the structural requirements, for example, of a suitcase contemplate the use of .060 board I may, for example, choose a .007 or .015 or .020 chip for the layer 8. The material thus far produced (as shown in Figure 3) is then embossed in accordance with the teachings hereinabove set forth. In the manufacture of blanks the product of Figure 5 is made by adhering the product of Figure 3 to the backing 10 which could be .040 or .045 or .053 chip in the example described. This can all be done prior to dieing out and scoring the blanks if desired; or the material of Figure 3 may be adhered to previously died-out blanks 10. By making a composite structure of this type less total weight for given strength requirements may be employed.

In Figure 14 I have shown at 11 a blank for a suitcase body. This blank has a bottom portion 12, side portions 13 and 14 and end flaps 15. These several elements are separated by score lines indicated in dotted lines in the figure. Figure 16 will illustrate how the blank is employed in the formation of a suitcase, in connection with end blanks 16 as shown in Figure 18. The parts are assembled as shown and the flaps 15 folded over onto the members 16 and sewn or riveted and/or pasted as desired. Since there may be an advantage in having the flaps 15 of less than full thickness, it is in many instances preferable to cut the material 10 to comprise only the elements 12, 13 and 14. Then the material of Figure 3 is adhered to it and the flaps 15 formed only in the material of Figure 3. Also it is possible to provide the flaps 15 with thin extensions of the embossed material which can be turned over and cemented against the flaps to avoid the presentation of a cut edge in the completed article. This is indicated in dotted lines. The end pieces 16 will normally be of the material of Figure 5. The top of the suitcase 17 may be formed in a similar manner, or otherwise as desired.

Inexpensive suitcases as illustrated in Figure 19 are usually formed with a narrow inner rim of wood or metal in the top and in the bottom along the line of juncture of the two. Less frequently all portions of the side and end members of the suitcase are lined with or built around a wooden structure. It is usual to line these suitcases and this will normally be done with a printed paper, although cloth is sometimes employed. The double creped paper which has been referred to, when printed with a suitable design is especially desirable for this purpose. The suitcase is given the required fittings and is then complete.

In the manufacture of other types of luggage different procedures are followed. For example, there is a class of inexpensive luggage known as the "overnight bag" class. This type usually has a complete wooden frame on sides and ends of both the top and bottom parts. The top and bottom panels may be made either of thin wood or as is more usual, of box-board or so-called solid fiber board. After the manufacture of the body of the case the edges are rounded and the outer surfaces are then covered with a suitable material by pasting, lap joints being available because the covering material is relatively thin. For this purpose the material of Figure 2 is especially desirable. It is supplied either in rolls or sheets for pasting, and the structure when formed is like that shown in Figure 4. The procedure used in fabricating the overnight case with my materials is not substantially different from that now employed.

There is a third type of inexpensive luggage known generally as "flexible luggage" and ranging from small zipper cases to gladstone bags.

Adequate tear resistance can be secured in my products in several ways, but most conveniently and economically by the incorporation of cloth. I have illustrated in Figure 14 an embossed product made of layers 1 and 2 of paper, and a layer 18 of cloth held together by a suitable adhesive 3. I have already indicated hereinabove that it is preferable in the formation of such articles that the interstices of the cloth be filled up with the adhesive or with additional adhesive and have indicated ways in which this can be accomplished. An embossed product such as that shown in Figure 14 is strong and cannot be readily torn. The use of the layers of paper 1 and 2 and the adhesive in connection with the cloth make the embossing permanent as respects the cloth, a factor of paramount importance, as will be understood. Cloth alone may be caused under many circumstances to follow the configurations of an embossing die but will soon lose these configurations. When the cloth is joined with stretchable paper the embossed configurations become permanent. This is contributed to by the filling up of the cloth; and further the filling up of the cloth prevents the grain of the cloth showing through the paper when the product is embossed. If a greater degree of stiffness is required in the article of Figure 14, it may be secured by giving to the cloth a pretreatment for stiffening. A number of treatments are available. Most simply, the cloth may be treated with a binder substance which sets to a stiff condition, preferably, however, not becoming brittle. Certain resinous substances may be employed and also shellacs, lacquers and the like. However, where the layers of paper 1 and 2 have been creped by means of a waterproofed adhesive 3, I have found it readily possible to employ animal or vegetable glues and similar substances as stiffening agents. These are prevented from softening by the water and moisture resistant characteristics of the composite fabric. The cloth may likewise be treated with cellulosic substances and/or partially converted into cellulosic compounds, e. g. cellulose esters. While I have illustrated in Figure 14 a simple fabric, it will be understood that the paper layers 1 and 2 may be multiplied as desired, and that the fabric of Figure 14 may, if desired, be joined to backing substances after the manners illustrated in Figs. 3, 4 and 5.

The addition of a layer of board to the article of Figure 14, after the manner of Figure 3, will give a product possessing both body and stiffness. Such a product may be described as comprising in the order named: universally stretchable creped paper as a facing sheet, a layer of asphalt, stiffened cloth, a layer of asphalt, a layer of chipboard, a layer of asphalt, and a backing of paper which is preferably, though not by way of necessary limitation, creped paper.

In Figure 15 I have illustrated another type of fabric which while retaining flexibility possesses a higher degree of body stiffness. Here a material such as that illustrated in Figure 2 and given like index numerals, is shown joined by means of an adhesive 19 to a composite formed of a layer of cloth 20 sandwiched between layers of plain papers 21 and 22, this structure being adhered together by means of an adhesive binder 23. A variant of this structure would be a combination of a cloth and a single layer of heavy paper, or paperboard such as chip board. It is advisable to cause the binder to penetrate the interstices of the cloth excepting where the cloth is otherwise filled; and I may also treat my cloth for stiffness in the ways outlined above. The combination of cloth sandwiched between plain paper gives a sort of trussing action which contributes very greatly to the stiffness and resilience of the composite product. The cloth additionally contributes tear resistance. The structure illustrated in Figure 15 may be surfaced on its under side by a suitable liner 24 held in place by a layer of adhesive 25. This gives a product which can be made to simulate fine thick leather, both in appearance and in body, feel, stiffness, texture and resilience. It is a material of especial value in the formation of soft goods luggage in the same way in which luggage could be made of fine leather. Whereas in flexible luggage the leather or leather substitute is reinforced for stiffness with sized burlap in the areas where stiffness is required, and then lined to mask the stiffening substance, in my fabrics as described, all necessary qualities are combined in the single unitary structure, whereby the making of the final article is simplified and cheapened.

Still another fabric for similar uses is shown in Figure 16. Here the surface is creped paper shown at 36. Another layer of creped paper 37 may be employed, the two layers being held together by a layer of adhesive 38, and secured to cloth 39 by adhesive 40. The cloth may be stiffened as described above. A layer of board 41 will be adhered to the cloth by adhesive 42. To finish the back side of the product a layer, usually of printed paper 43, and preferably creped, may be adhered to the board by means of adhesive 44. Usually the whole product will be embossed as shown; though permissible variants are the embossing of only the layers of paper 36 and 37 or the combination of the said paper layers and the cloth layer.

Figure 6:
Figure 6 is a sectional view of a panel having an embossed face.

In the embossing procedures thus far described in connection with the figures, two-sided embossing has been employed. Figure 6 illustrates one form of one sided embossing. Here a layer of paper 26 of stretchable character has been joined by means of adhesive 27 to a body 28 of substantial thickness but of compressible character as respects the forces used in embossing; and the whole has been embossed between a flat plate or platen and a female or pattern die. In the formation of the embossing the body substance 28 has been compressed. The paper layer 26 adhesively secured to it prevents disruption of the body. Various materials are available as body substances, for example, heavy layers of solid fiber board will act in this way if the pressure used is sufficient. Various types of fibrous wall board of solid felted character are of interest. The so-called Celotex may be employed in this way as well as similar substances of finer grained texture. Materials fabricated in this way are useful as interior or exterior decorative or protective paneling in buildings, vehicles and the like.

Figure 7:
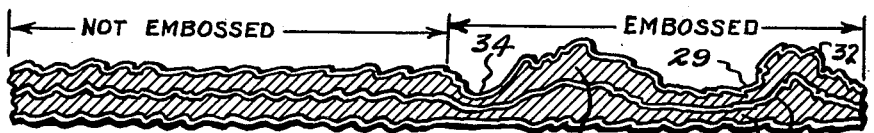
Figure 7 is a sectional view of an embossed fabric illustrating the principle of plastic flow.

In Figure 7 I have illustrated in a somewhat exaggerated way the principle of plastic flow in embossing. In this figure I have shown three layers of paper 29, 30, 31, or creped cloth or the like, held together by layers of adhesive 32, 33. The adhesive is one which either retains at ordinary temperatures a resident plasticity or can be plasticized under heat or by means of solvents or the like. The left hand part of the figure illustrates the structure prior to embossing. The layers of adhesive may be fairly thick and fairly uniform. In the right hand portion of the figure it will be noted that the embossing treatment has served to displace the adhesive by plastic flow. The adhesive is thinner as at 34, in places where the material has been compressed, and is thicker as at 35, over the areas of recesses in the female die.

As binder substances asphalts are available as well as other bitumens, waxes, pitches, tars and lacs. Resinous substances are likewise available; and their use permits me to secure certain effects which so far as I know have not hitherto been secured. In the formation of laminated resinous articles, layers of paper or cloth are saturated with a resin varnish, which is a synthetic resin in an incomplete stage of polymerization dissolved in a suitable vehicle. By way of a single example the resin may be a phenol aldehyde resin and the solvent alcohol or water or a combination of the two. In forming laminated resinous articles with plain paper laminae, it has been found difficult and in many cases impossible to mold configurations in the surfaces of the panel. With the use, however, of stretchable creped papers and preferably the universally stretchable double-diagonally creped papers of Kemp, a laminated structure may be formed which readily takes deep surface configurations, the configurations being fully reinforced by the fibrous laminae. Cloth may be creped and treated in the same way. By way of a single example, the manufacture of a suitable and relatively inexpensive male die for platen embossing can be accomplished in this way: A number of saturated laminae of plain paper or cloth in dried condition are assembled in the platen and a number of layers of universally stretchable paper or cloth also saturated in the incomplete resin are laid on top of the stack. Then the previously formed female die is brought down on top of the stack and the stack is heated by heating the platen so as to bring the resin to a state of final polymerization in which it is hard, infusible and insoluble.

After the curing cycle the female die is raised and the male die as a complete panel is removed.

The securing of plies of stretchable fabric saturated with varnish, while it may be accomplished in other ways, is most conveniently done by creping the paper using the resin as the creping adhesive. Thus plain paper or cloth may be saturated in a resin varnish and dried, the state of polymerization of the varnish being such that it can be plasticized by heat on or near the creping cylinder to a sufficient extent to cause the paper to adhere to the cylinder. Creping is then accomplished in the same way as with other thermoplastic adhesives. In some instances where a treatment of the resin varnish with heat is to be avoided, plain paper may be saturated with varnish and then incompletely dried so as to retain a tacky character, or dried laminae may be rendered tacky by the application of a solvent. Also paper or cloth may be saturated in resin melted by heat, or resin powder may be dusted on a creping drum which has been heated sufficiently to render the resin tacky just before the unsaturated or previously saturated web is led against the drum.

In some fabrics resilience is desired along with appearance. Resilience may be imparted to fabrics by the use of rubber layers or rubber-coated cloth. Neither rubber nor rubberized cloth alone will retain embossing perfectly; but either, in combination with one or more layers of universally stretchable paper, can be caused to retain deep embossing. Thus rubber coated sheetings backed with crepe paper can be successfully embossed, as can similarly backed oil cloth or pyroxylin-coated sheetings. Universally stretchable paper backed with rubber coated burlap or cotton will produce an embossed product which likewise possesses resilience.

Hereinabove I have described the various aspects of my invention in certain exemplary embodiments. It will be understood that modifications may be made in my invention without departing from the spirit of it.

What I claim therefore as new and desire to secure by Letters Patent, is:

1. An embossed product, comprising a paper having a fine and uniform character of creping crinkles such as are formed when paper is creped by means of the positive adhesive action of a thermoplastic substance, and coated on one side therewith, said paper being multi-laterally stretchable and a thin fibrous substance opposite said paper in adhesive contact with said thermoplastic layer, the whole being embossed with an overall design of raised and depressed portions to the extent of eliminating the visual appearance of the creping crinkles in said paper.

2. An embossed product, comprising a paper having a fine and uniform character of creping crinkles such as are formed when paper is creped by means of the positive adhesive action of a thermoplastic substance, and coated on one side therewith, said paper being multi-laterally stretchable and a relatively thin fibrous substance opposite said paper in adhesive contact with said thermoplastic layer, the whole being embossed with an overall design of raised and depressed portions to the extent of eliminating the visual appearance of the creping crinkles in said paper, said product joined to an unembossed backing material by means of adhesive contacting said thin fibrous layer.

3. An embossed product comprising at least one layer of creped paper, and a backing substance of the nature of box board, the whole being conjointly embossed to the extent of destroying the visual appearance of the creping crinkles in said paper.

4. An embossed product comprising at least one layer of creped paper, and a backing substance of the nature of box board, the whole being conjointly embossed to the extent of destroying the visual appearance of the creping crinkles in said paper, the surface of said paper being filled with a coloring material in a vehicle.

5. An embossed product comprising at least one layer of creped paper, and a backing substance of the nature of box board, the whole being conjointly embossed to the extent of destroying the visual appearance of the creping crinkles in said paper, said embossed product being adhesively joined to an unembossed panel of the nature of box board.

6. A product comprising a plurality of plies of universally stretchable creped paper, secured together by layers of adhesive therebetween, the whole being embossed with an overall design of raised and depressed portions to the extent of destroying the visual appearance of the creping crinkles in a surface layer of said creped paper, the said product being characterized after embossing by uneven thickness of said adhesive conforming to the embossings whereby the rugosities formed by said embossing are supported from beneath.

7. A product as claimed in claim 2 with a thin layer of decorated paper adhered to the opposite face of said backing material.

8. A product as claimed in claim 5 with a printed paper layer adhered to the opposite side of said unembossed panel.

9. A blank for a suitcase comprising essentially two layers in adhesive union, the first of said layers comprising at least one ply of universally stretchable paper in adhesive union with relatively thin box board, said layer being embossed as a whole with an overall pattern of raised and depressed portions, and the other of said layers comprising a heavier body of unembossed box board.

10. A blank for a suitcase comprising essentially two layers in adhesive union, the first of said layers comprising at least one ply of stretchable paper in adhesive union with relatively thin box board, said layer being embossed as a whole, and the other of said layers comprising a heavier body of unembossed box board, said unembossed layer having an external covering on its exposed side of decorated paper.

11. A blank for a suitcase comprising essentially two layers in adhesive union, the first of said layers comprising at least one ply of stretchable paper in adhesive union with relatively thin box board, said layer being embossed as a whole, and the other of said layers comprising a heavier body of unembossed box board, and said first layer extending beyond said second layer at one place at least and folded over so as to present a folded edge for said blank whereby to avoid the appearance of cut edges.

12. A process of producing a decorative product which comprises joining stretchable paper to a backing material of relatively thin box board, conjointly embossing said paper and said box board, and afterward joining said embossed product to a panel-like structure.

WILLIAM WALLACE ROWE.